United States Patent
Matsumura et al.

(10) Patent No.: US 8,645,058 B2
(45) Date of Patent: Feb. 4, 2014

(54) VEHICLE DRIVE SUPPORT DEVICE

(75) Inventors: Takeshi Matsumura, Chofu (JP); Yuki Yamada, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 335 days.

(21) Appl. No.: 13/203,417

(22) PCT Filed: Mar. 3, 2009

(86) PCT No.: PCT/JP2009/053974
§ 371 (c)(1),
(2), (4) Date: Aug. 25, 2011

(87) PCT Pub. No.: WO2010/100723
PCT Pub. Date: Sep. 10, 2010

(65) Prior Publication Data
US 2011/0313592 A1 Dec. 22, 2011

(51) Int. Cl.
*G06F 7/00* (2006.01)
(52) U.S. Cl.
USPC ............ 701/411; 701/420; 701/450; 701/451
(58) Field of Classification Search
USPC ......... 701/409–416, 418, 420–425, 450, 451, 701/452
See application file for complete search history.

(56) References Cited

U.S. PATENT DOCUMENTS 6,678,614 B2 * 1/2004 McCarthy et al. ............ 701/440
7,158,881 B2 * 1/2007 McCarthy et al. ............ 701/443

FOREIGN PATENT DOCUMENTS

| JP | 2000-331289 A | 11/2000 |
| JP | 2006-275777 A | 10/2006 |
| JP | 2008-108040 A | 5/2008 |

OTHER PUBLICATIONS

International Preliminary Report on Patentability for corresponding International Patent Application No. PCT/JP2009/053974, dated Oct. 27, 2011.

* cited by examiner

*Primary Examiner* — Richard Camby
(74) *Attorney, Agent, or Firm* — Sughrue Mion, PLLC (57) ABSTRACT

In a vehicle drive support device 10a including an optical beacon communicator 11 that acquires exterior information on roads from an optical beacon communicator 100 on the roadside outside a subject vehicle, a navigation system 12 that acquires interior information on roads inside the subject vehicle and a vehicle drive support processing unit 24 that performs vehicle drive support of the subject vehicle using the exterior information acquired by the optical beacon communicator 11, the vehicle drive support processing unit 24 changes use aspects of the exterior information for the vehicle drive support in accordance with the interior information acquired by the navigation system 12. Accordingly, it becomes possible to perform the vehicle drive support by more efficiently using the information from outside of the subject vehicle.

10 Claims, 8 Drawing Sheets

VEHICLE DRIVE SUPPORT DEVICE

CROSS REFERENCE TO RELATED APPLICATIONS

This application is a National Stage of International Application No. PCT/JP2009/053974 filed Mar. 3, 2009, the contents of all of which are incorporated herein by reference in their entirety.

TECHNICAL FIELD

The present invention relates to a vehicle drive support device, and more particularly to a vehicle drive support device which acquires information on roads from an external information source outside the subject vehicle and an internal information source inside the vehicle and performs vehicle drive support of the subject vehicle using the corresponding information.

BACKGROUND ART

A device has been proposed in the related art, which acquires road information from an external information source outside a subject vehicle of VICS (Vehicle Information and Communication System) through an optical beacon communicator in roadside equipment and an internal information source inside the subject vehicle such as map information of a navigation system and performs vehicle drive support of the subject vehicle using the corresponding information. For example, Patent Literature 1 discloses a navigation device which receives VICS information that is transmitted from a VICS center through a VICS reception unit and compares a VICS link ID in the received VICS information with a map link ID in map data recorded in an HDD with reference to information that indicates a corresponding relationship between a pre-stored VICS link ID and the map link ID. This navigation device specifies a mesh that includes a VICS link ID for which the corresponding map link ID does not exist from the result of this comparison, downloads updated map data of the mesh from an updated map data transfer center to the navigation device, and partially updates the map data recorded in the HDD.

CITATION LIST

Patent Literature

Patent literature 1: Japanese Unexamined Patent Application Publication No. 2006-275777

SUMMARY OF INVENTION

Technical Problem

However, in the optical beacon communicator, the capacity that can he transmitted is small, and thus it is difficult to sufficiently update the map data of the navigation system immediately. Accordingly, it is considered that the road information acquired from the roadside equipment and the road information acquired from the map data of the navigation system mounted on a vehicle are compared with each other, and if both sets of information coincide with each other, the vehicle drive support based on the map data of the navigation system is performed, while if both sets of information do not coincide with each other, the vehicle drive support based on the road information acquired from the roadside equipment is performed.

However, in the case of determining which information to base on to perform the vehicle drive support only according to the coincidence or the non-coincidence of the road information acquired from the roadside equipment and the road information acquired from the map data of the navigation system mounted on the vehicle, a lot of time is required to process the information acquired from the roadside equipment, and thus the vehicle drive support may start. late. In this case, there is a possibility that the information from the roadside equipment will not efficiently used.

In consideration of the above-described circumstances, an object of the present invention is to provide a vehicle drive support device which can perform vehicle drive support through a more efficient use of the information from outside of the subject vehicle.

Solution to Problem

A vehicle drive support device according to an embodiment of the present invention may include exterior information acquisition means capable of acquiring exterior information on roads from an external information source outside a subject vehicle; interior information acquisition means capable of acquiring interior information on roads from an interior information source inside the subject vehicle; and vehicle drive support means for performing vehicle drive support of the subject vehicle using the exterior information acquired by the exterior information acquisition means, wherein the vehicle drive support means changes use aspects of the exterior information for the vehicle drive support in accordance with the interior information acquired by the interior information acquisition means.

According to this configuration, in the vehicle drive support device including the exterior information acquisition means acquiring the exterior information on the roads from the external information source outside the subject vehicle, the interior information acquisition means acquiring the interior information on the roads from the interior information source inside the subject vehicle, and the vehicle drive support means for performing the vehicle drive support of the subject vehicle using the exterior information acquired by the exterior information acquisition means, the vehicle drive support means changes the use aspects of the exterior information for the vehicle drive support in accordance with the interior information acquired by the interior information acquisition means. Accordingly, the exterior information can be used in accordance with the interior information, and it becomes possible to perform the vehicle drive support through a more efficient use of the information from outside of the subject vehicle.

In this case, it is preferable that the exterior information acquisition means changes the exterior information to be acquired in accordance with the time when the interior information acquisition means acquires the interior information.

It is considered that the interior information has a different reliability in accordance with the time when the interior information is acquired. According to this configuration, since the exterior information acquisition means changes the exterior information to be acquired in accordance with the time when the interior information acquisition means acquires the interior information, the exterior information acquisition means changes the exterior information to be acquired in accordance with the reliability of the interior information, and thus it becomes possible to perform the vehicle drive support through the more efficient use of the information from outside of the subject vehicle.

Also, it is preferable that the vehicle drive support means performs the vehicle drive support of the subject vehicle using the interior information acquired by the interior information acquisition means, and the exterior information acquisition means changes the exterior information to be acquired in accordance with the contents of the vehicle drive support of the subject vehicle that the vehicle drive support means performs using the interior information.

It is considered that the exterior information to be acquired as needed may differ depending on which vehicle drive support is to be performed using the interior information inside the subject vehicle. According to this configuration, since the exterior information acquisition means changes the exterior information to be acquired in accordance with the contents of the vehicle drive support of the subject vehicle that the vehicle drive support means performs using the interior information, the exterior information acquisition means changes the exterior information to be acquired depending on which vehicle drive support is to be performed using the interior information inside the subject vehicle, and thus it becomes possible to perform the vehicle drive support through the more efficient use of the information from outside of the subject vehicle.

Also, it is preferable that the vehicle drive support means performs the vehicle drive support of the subject vehicle by adding the interior information to the exterior information in accordance with the time when the interior information acquisition means acquires the interior information.

It is considered that the interior information has a different reliability in accordance with the time when the interior information is acquired. According to this configuration, since the vehicle drive support means performs the vehicle drive support of the subject vehicle by adding the interior information to the exterior information in accordance with the time when the interior information acquisition means acquires the interior information, the interior information is added to the exterior information in accordance with the reliability of the interior information, and thus it becomes possible to perform the vehicle drive support through the more efficient use of the information from outside of the subject vehicle.

A vehicle drive support device according to another embodiment of the present invention may include exterior information acquisition means capable of acquiring exterior information on roads from an external information source outside a subject vehicle; interior information acquisition means capable of acquiring interior information on roads from an interior information source inside the subject vehicle; and vehicle drive support means for performing vehicle drive support of the subject vehicle using at least one of the exterior information acquired by the exterior information acquisition means and the interior information acquired by the interior information acquisition means, wherein the exterior information acquisition means determines whether to acquire the exterior information or changes the exterior information to be acquired in accordance with the time when the interior information acquisition means acquires the interior information.

According to this configuration, in the vehicle drive support device in which the vehicle drive support means performs the vehicle drive support of the subject vehicle using at least one of the exterior information acquired by the exterior information acquisition means and the interior information acquired by the interior information acquisition means, the exterior information acquisition means determines whether to acquire the exterior information or changes the exterior information to be acquired in accordance with the time when the interior information acquisition means acquires the interior information. Accordingly, the exterior information acquisition means determines whether to acquire the exterior information or changes the exterior information to be acquired in accordance with the reliability of the interior information, and thus it becomes possible to perform the vehicle drive support through the more efficient use of the information from outside of the subject vehicle.

A vehicle drive support device according to still another embodiment of the present invention may include exterior information acquisition means capable of acquiring exterior information on roads from an external information source outside a subject vehicle; interior information acquisition means capable of acquiring interior information on roads from an interior information source inside the subject vehicle; and vehicle drive support means for performing vehicle drive support of the subject vehicle using at least one of the exterior information acquired by the exterior information acquisition means and the interior information acquired by the interior information acquisition means, wherein the exterior information acquisition means changes the exterior information to be acquired in accordance with the contents of the vehicle drive support of the subject vehicle that the vehicle drive support means performs using the interior information.

According to this configuration, in the vehicle drive support device in which the vehicle drive support means performs the vehicle drive support of the subject vehicle using at least one of the exterior information acquired by the exterior information acquisition means and the interior information acquired by the interior information acquisition means, the exterior information acquisition means changes the exterior information to be acquired in accordance with the contents of the vehicle drive support of the subject vehicle that the vehicle drive support means performs using the interior information. Accordingly, the exterior information acquisition means changes the exterior information to be acquired depending on which vehicle drive support is to be performed using the interior information inside the subject vehicle, and thus it becomes possible to perform the vehicle drive support through the more efficient use of the information from outside of the subject vehicle.

Also, as described above, in the case where the exterior information acquisition means changes the exterior information to be acquired in accordance with the time when the interior information acquisition means acquires the interior information, it is preferable that the exterior information acquisition means lessens the exterior information to be acquired to the extent that the time when the interior information acquisition means acquires the interior information is recent.

It is considered that the interior information has a higher reliability as the acquiring time is recent, and thus a lot of exterior information is unnecessary. According to this configuration, since the exterior information acquisition means lessens the exterior information to be acquired as the time when the interior information acquisition means acquires the interior information is recent, the exterior information acquisition means lessens the exterior information to be acquired as the interior information is recent and the reliability becomes higher, and thus it becomes possible to perform the vehicle drive support through the more efficient use of the information from outside of the subject vehicle.

Also, as described above, in the case where the vehicle drive support means performs the vehicle drive support of the subject vehicle using the interior information acquired by the interior information acquisition means and the exterior information acquisition means changes the exterior information to be acquired in accordance with the contents of the vehicle drive support of the subject vehicle that the vehicle drive support means performs using the interior information, it is preferable that the exterior information acquisition means lessens the exterior information to be acquired as a priority of the contents of the vehicle drive support of the subject vehicle, which the vehicle drive support means performs using the interior information, becomes higher.

It is considered that if the priority of the contents of the vehicle drive support of the subject vehicle, which the vehicle drive support. means performs using the interior information, becomes higher, the priority of the vehicle drive support using the exterior information becomes lower, and the necessity of the exterior information becomes lower. According to this configuration, the exterior information acquisition means lessens the exterior information to be acquired as the priority of the contents of the vehicle drive support of the subject vehicle, which the vehicle drive support means performs using the interior information, becomes higher, and if the necessity of the exterior information is low, the exterior information acquisition means lessens the exterior information to be acquired, and thus it becomes possible to perform the vehicle drive support through the more efficient use of the information from outside of the subject vehicle.

Also, as described above, in the case where the vehicle drive support means performs the vehicle drive support of the subject vehicle by adding the interior information to the exterior information in accordance with the time when the interior information acquisition means acquires the interior information, it is preferable that the vehicle drive support means performs the vehicle drive support of the subject vehicle by lessening the interior information that is added to the exterior information as the time when the interior information acquisition means acquires the interior information becomes earlier.

It is considered that the interior information has a lower reliability as the acquiring time becomes earlier, and thus the interior information that should be added to the exterior information becomes less. However, according to this configuration, since the vehicle drive support means lessens the interior information that is added to the exterior information as the time when the interior information acquisition means acquires the interior information becomes earlier, the vehicle drive support means lessens the interior information that is added to the exterior information as the reliability of the interior information becomes lower, and thus it becomes possible to perform the vehicle drive support through the more efficient use of the information from outside of the subject vehicle.

Advantageous Effects Of Invention

According to the vehicle drive support device according to the present invention, it is possible to perform the vehicle drive support by more efficiently using the information from outside of the subject vehicle.

DESCRIPTION OF REFERENCE 10a, 10b: VEHICLE DRIVE SUPPORT DEVICE
11: OPTICAL BEACON COMMUNICATOR
12: NAVIGATION SYSTEM
20: ECU
21: COMPARISON UNIT
22: RELIABILITY DETERMINATION UNIT
23: INFORMATION INTEGRATION UNIT
24: VEHICLE DRIVE SUPPORT PROCESSING UNIT
25: DATA FRESHNESS DETERMINATION UNIT
26: DATA REQUIREMENT RANGE DETERMINATION UNIT
31: INFORMATION PROVIDING DEVICE
32: VARIOUS KINDS OF ACTUATORS
40: ANOTHER VEHICLE DRIVE SUPPORT SYSTEM
111, 112: STOP LINE
121 to 126: SIGNAL DEVICE
140: CROSSING POINT
151 to 153: STOP SIGN
161: BYROAD
200: SUBJECT VEHICLE

Description of Embodiments

Figure 1:
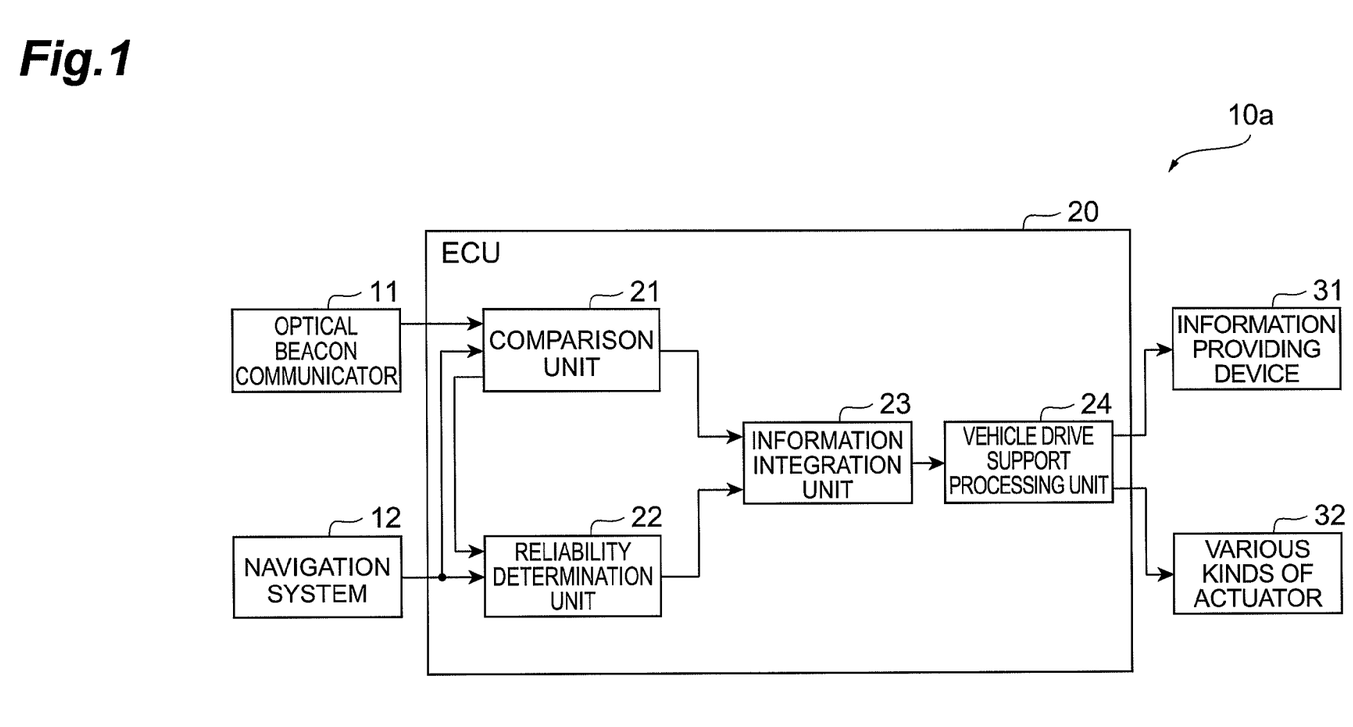
FIG. 1 is a block diagram illustrating the configuration of a vehicle drive support device according to a first embodiment of the invention.

Hereinafter, a vehicle drive support device according to a first embodiment of the invention will be described with reference to the accompanying drawings. As illustrated in FIG. 1, a vehicle drive support device 10a according to this embodiment of the invention is configured by connecting an optical beacon communicator 11, a navigation system 12, an information providing device 31, and various kinds of actuators 32 to an ECU 20. The vehicle drive support device 10a according to this embodiment is mounted on a subject vehicle, and performs vehicle drive support, of the subject vehicle based on information (hereinafter may be called as "exterior information") that is acquired by the optical beacon communicator 11 from roadside equipment and information (hereinafter may be called as "interior information") that is acquired from the navigation system 12. Particularly, in this embodiment, the interior information that is to be added to the exterior information that is acquired by the optical beacon communicator 11 is changed in accordance with the reliability of the interior information acquired by the navigation system 12.

The optical beacon communicator 11 is to acquire information on roads, such as existence/nonexistence of a crossing point or a signal device and the change of signal (signal cycle)

indicated by the signal device, from the optical beacon communicator of the roadside equipment outside the subject vehicle.

The navigation system 12 is to acquire information on the roads inside the subject vehicle in addition to performing of a path guide of the subject vehicle from a GPS (Global Positioning System) which measures the position of the subject vehicle using differences among signals that are received from a plurality of GPS satellites through a GPS receiver and a map information DB (Data Base) which stores map information inside the subject vehicle.

The ECU 20 includes a comparison unit 21, a reliability determination unit 22, an information integration unit 23, and a vehicle drive support processing unit 24. The comparison unit 21 is to compare external information on roads acquired by the optical beacon communicator 11 with interior information on roads acquired by the navigation system 12.

The reliability determination unit 22 is to determine the reliability of the interior information on roads acquired by the navigation system 12.

The information integration unit 23 is to integrate the exterior information on roads acquired by the optical beacon communicator 11 and the interior information on road acquired by the navigation system 12 in accordance with the reliability of the interior information on the roads determined by the reliability determination unit 22.

The vehicle drive support processing unit 24 is to output command signals for performing vehicle drive support to the information providing device 31 or the various kinds of actuators 32 by executing infrastructure cooperation applications such as a signal oversight prevention function and the like based on the exterior information and the interior information on the roads integrated by the information integration unit 23.

The information providing device 31 is, specifically, a liquid crystal display or a speaker of the navigation system 12 that provides information for the vehicle drive support to a driver of the subject vehicle. The various kinds of actuators 32 may be, specifically, an accelerator actuator that changes the degree of accelerator opening, a brake actuator that changes the brake strength, and a steering actuator that changes a rudder angle, and to drive the subject vehicle regardless of the driver's operation.

Figure 2:
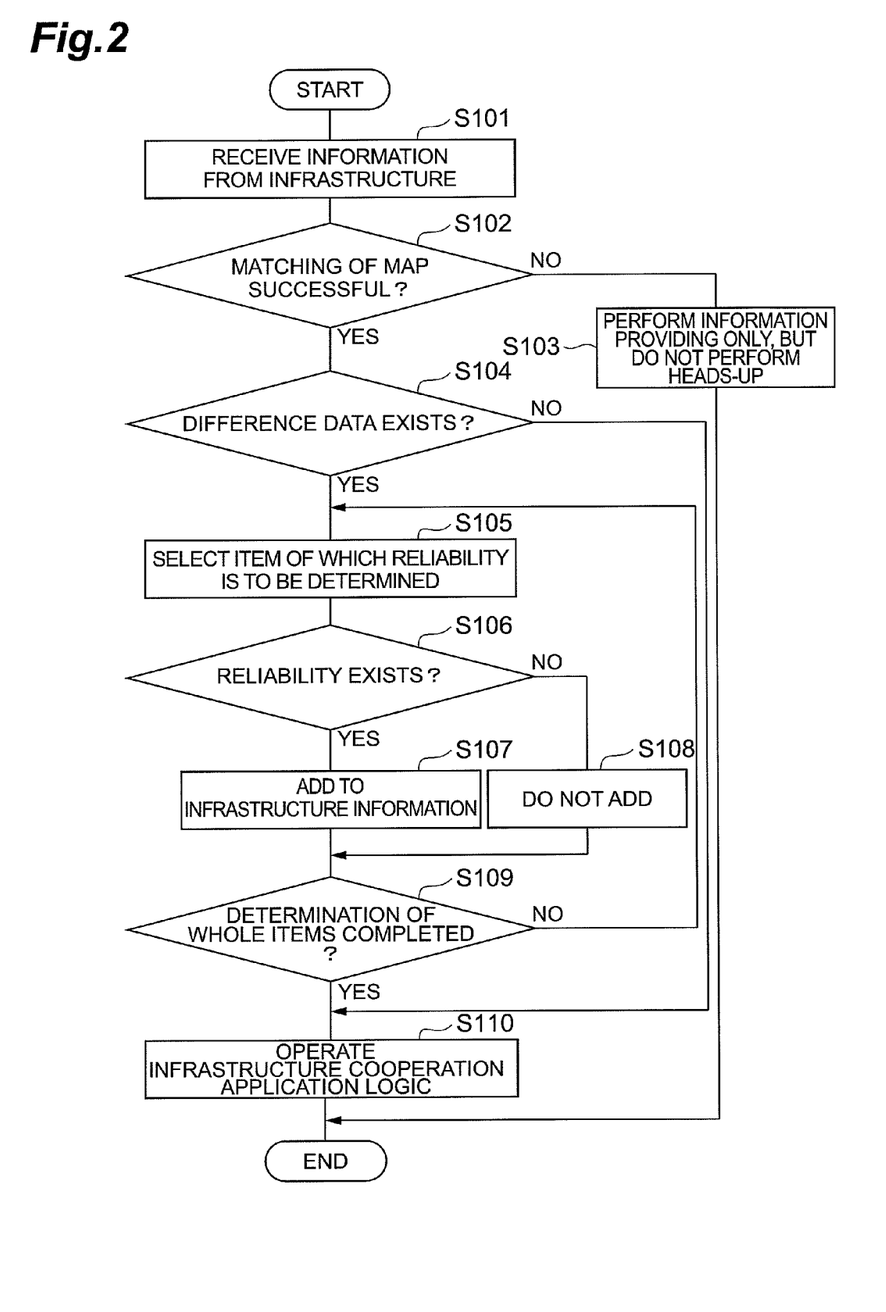
FIG. 2 is a flowchart illustrating an operation of the vehicle drive support device according to the first embodiment of the invention.

Hereinafter, the operation of the vehicle drive support device 10a according to this embodiment will be described. The optical beacon communicator 11 receives information on roads which is transmitted from the optical beacon communicator of the roadside equipment (S101).

Figure 3:
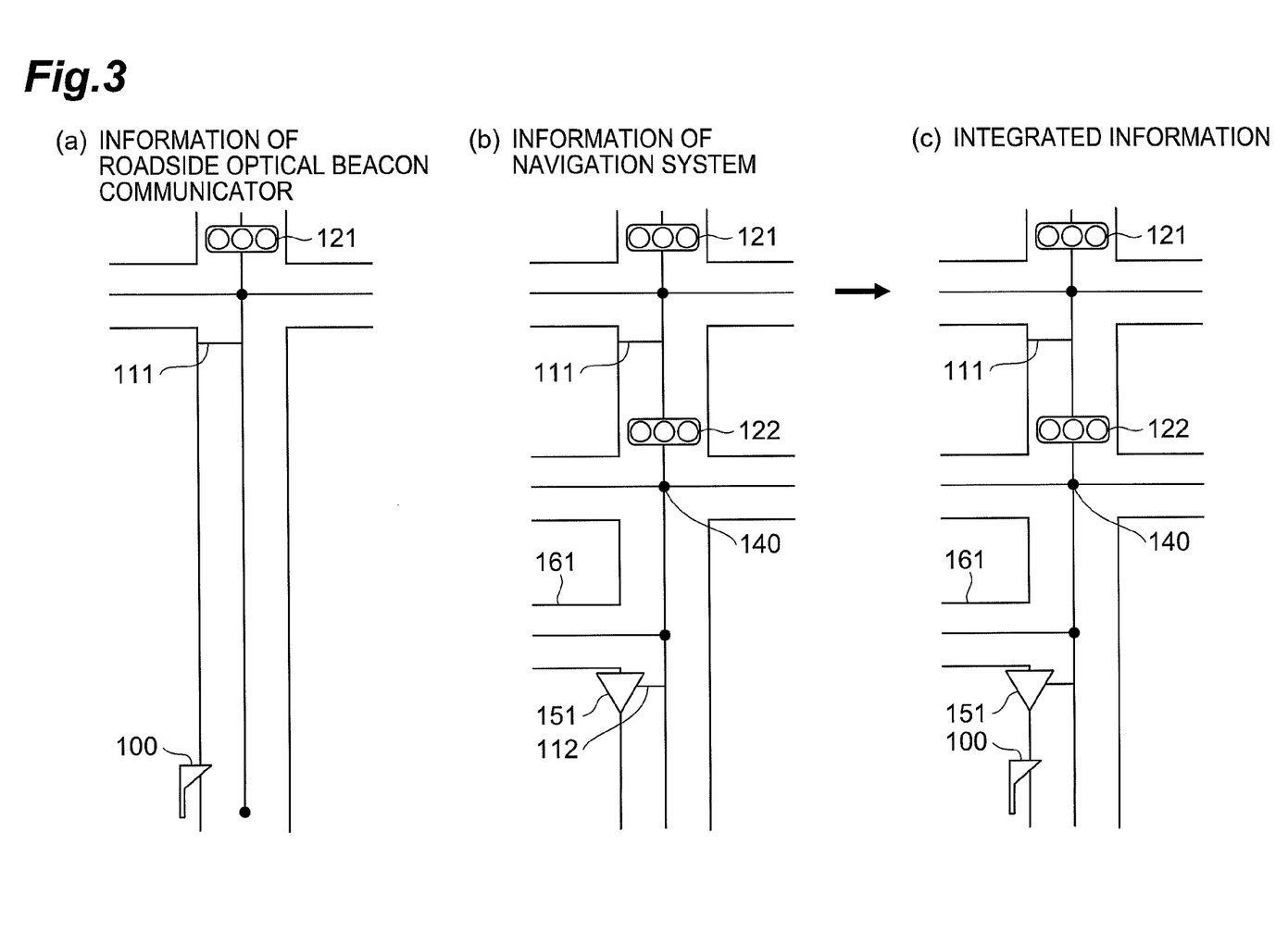
FIGS. 3(a) to 3(c) are plan views illustrating information of a roadside optical beacon communicator, information of a navigation system, and information of integration of the information of the communicator and the information of the navigation system.

Here, as illustrated in FIG. 3(a), the information from the roadside optical beacon communicator 100 includes information on the existence of the signal device 121 and cycles (signal cycles) of the change of signals indicated by the signal device 121, and information on a stop line position 111 of the signal device 121. The information transmitted from the roadside beacon communicator 100 has the property that the amount of information may be small or insufficient since there is a limit in data capacity, but the information does not include extra information or wrong information.

In this case, as illustrated in FIG. 3(b), the information acquired from the map data DB of the navigation system 12 inside the vehicle includes information on an intermediate crossing point 140, information on the existence of a signal device 122, information on an intermediate byroad 161, information on a stop sign 151, and information on a stop line position 112 of the stop sign 151 in addition to information on the existence of the signal device 121 and information on a stop line position 111 of the signal device 121. The information acquired from the navigation system 12 has the possibility that an error occurs therein since the amount of information is large but there is the possibility that the update time of the map information DB may become old.

The comparison unit 21 of the ECU 20 compares the information acquired from the roadside optical beacon communicator 100 with the information acquired from the navigation system 12 (S102). As described above, since the information obtained from the roadside optical beacon communicator 100 is accurate and there may be insufficient data but there is no extra data or wrong data. Therefore, if there is no coincident portion between the information acquired from the roadside optical beacon communicator 100 and the information acquired from the navigation system 12 in the first place, and matching is not performed (S102), the information integration unit 23 does not add the information of the navigation system 12 to the information from the roadside optical beacon communicator 100, and the vehicle drive support unit 24 provides information to the information providing device 31 only by the information from the roadside optical beacon communicator 100 without performing a heads-up (S103).

In the case where there is a coincident portion between the information acquired from the roadside optical beacon communicator 100 and the information acquired from the navigation system 12 and the matching is performed, the comparison unit 21 determines whether difference data exists between the information acquired from the roadside optical beacon communicator 100 and the information acquired from the navigation system 12 (S104).

As described above, there is a possibility that the information acquired from the navigation system 12 is not the latest one. If the difference data having different contents exists between the information acquired from the roadside optical beacon communicator 100 and the information acquired from the navigation system 12 (S104), the reliability determination unit 22 determines an item, of which the reliability is to be determined, with respect to the information acquired from the navigation system 12 based on the result of comparison performed by the comparison unit 21 (S105). The reliability determination unit 22 determines the reliability of the information acquired from the navigation system 12 with respect to the determined item (S106).

The determination of the reliability of the information acquired from the navigation system 12 may be performed, for example, as follows using the time when the corresponding information is acquired.

Regarding information on road construction, it takes a very long time to complete the road construction, and the reliability determination unit 22 determines that it is reliable if an update is performed within one year.

Regarding information on addition of road paint on a stop line position or the like and the change of a place, it takes a long time to add the road paint and to change a place, and the reliability determination unit 22 determines that it is reliable if an update is performed within three months.

Regarding information on deletion of road paint on a stop line position or the like, it takes a small amount of time to complete the deletion of the road paint, and the reliability determination unit 22 determines that it is reliable if an update is performed within one month.

Regarding information on a building in the neighborhood of a road, a reference period is unclear, and the reliability determination unit 22 determines that it is reliable if an update is performed within one week.

Also, the determination of the reliability of the information acquired from the navigation system 12, for example, may be performed as follows using the logic of the contents of the corresponding information.

The information from the navigation system 12 is given to the information acquired from the roadside optical beacon communicator 100, and in the case where three or more signal crossing points exist within 50 m, the reliability determination unit 22 determines that the information from the corresponding navigation system 12 is unreliable.

If information on a crossing road having a node in the center of a road exists in the information from the navigation system 12 at a crossing point where a non-crossing center divider exists in the information acquired from the roadside optical beacon communicator 100, the reliability determination unit 22 determines that the information from the corresponding navigation system 12 is unreliable.

Also, the information from the navigation system 12 is given to the information acquired from the roadside optical beacon communicator 100, and if the speed limit is greatly changed, for example, from 60 km/h to 30 km/h although the road width is not changed or no branch exists midway, the reliability determination unit 22 determines that the information from the corresponding navigation system 12 is unreliable.

The information from the navigation system 12 is given to the information acquired from the roadside optical beacon communicator 100, and in the case where a crossing point or a store exists in spite of the inside of a tunnel, the reliability determination means 22 determines that the information from the corresponding navigation system 12 is unreliable.

In this case, if plural sets of difference data exist between the information acquired from the roadside optical beacon communicator 100 and the information acquired from the navigation system 12, the reliability determination unit 22 may determine the reliability in the close order of their distance to the current position of the subject vehicle. Also, the reliability determination unit 22 may determine the reliability in the high order of predetermined importance of the information.

Also, if the rate of the data that is determined to be reliable among the difference data is equal to or less than a predetermined value, it may be considered that there is a possibility that an error occurs on the condition of determination of the comparison and matching which are performed by the comparison unit 21 in step S102 in the first place. In this case, the comparison unit 21 changes the condition of determination of the comparison and matching, and again determines the comparison and matching of the information acquired from the roadside optical beacon communicator 100 and the information acquired from the navigation system 12.

For example, if the condition of the determination of the comparison and matching, on which it is determined that the matching is made if the difference between the longitude and the latitude of the subject crossing point is equal to or less than a radius of 10 m, is made strict to he equal to or less than 5 m, an erroneous determination is reduced, but the non-matching state is increased, whereas if the condition is released, the erroneous determination is increased, but the non-matching state is reduced. Accordingly, the comparison unit 21 is strict to the condition of determination of the comparison and matching, and again determines the comparison and matching of the information acquired from the roadside optical beacon communicator 100 and the information acquired from the navigation system 12.

If it is determined that the information acquired from the navigation system 12 is reliable (S106), the information integration unit 23 adds the information acquired from the navigation system 12 to the information acquired from the roadside optical beacon communicator 100 (S107). On the other hand, if it is determined that the information acquired from the navigation system 12 is unreliable (S106), the information integration unit 23 does not add the information acquired from the navigation system 12 to the information acquired from the roadside optical beacon communicator 100 (S108).

For example, in an example of FIG. 3(c), although most of the information acquired from the navigation system 12 as illustrated in FIG. 3(b) is added to the information acquired from the roadside optical beacon communicator 100 as illustrated in FIG. 3(a), the information on the stop line position 112 is not added thereto since it is a long time since the update was made and thus the reliability is low.

In the case where the reliability determination of the above-described operation is completed with respect to the entire determination items (S109), or in the case where no difference data exists between the information acquired from the roadside optical beacon communicator 100 and the information acquired from the navigation system 12 (S104), the vehicle drive support unit 24 calculates the logic for executing the infrastructure cooperation applications such as a signal oversight prevention function and the like, and performs the vehicle drive support through the information providing device 31 or various kinds of actuators 32 (S110).

As aspects in that the vehicle drive support processing unit 24 executes the infrastructure cooperation applications, for example, the following aspects may be considered in the case of the signal oversight prevention function.

The vehicle drive support processing unit 24 performs deviance determination of the subject vehicle lane with respect to the vehicle movement in a place where a branch such as a crossing point or the like exists, and if the vehicle deviates from the subject vehicle lane, it terminates the service.

If another signal crossing point exists midway of the subject crossing point, the vehicle drive support processing unit 24 waits for the service until the vehicle passes the crossing point.

The vehicle drive support processing unit 24 changes the time for performing the service in consideration of the acceleration/deceleration that is caused by a gradient in a road having the gradient.

In this embodiment, in the vehicle drive support device 10a including the optical beacon communicator 11 acquiring the exterior information on the roads from the roadside optical beacon communicator 100 outside the subject vehicle, the navigation system 12 acquiring the interior information on the roads inside the subject vehicle, and the vehicle drive support processing unit 24 for performing the vehicle drive support of the subject vehicle using the exterior information acquired by the optical beacon communicator 11, the vehicle drive support processing unit 24 changes the use aspects of the exterior information for the vehicle drive support in accordance with the interior information acquired by the navigation system 12. Accordingly, the exterior information can be used in accordance with the interior information, and it becomes possible to perform the vehicle drive support through a more efficient use of the information from outside of the subject vehicle.

It is considered that the interior information acquired by the navigation system 12 has a different reliability in accordance with the time when the interior information is acquired. In this embodiment, since the information integration unit 23 performs the vehicle drive support of the subject vehicle by adding the interior information acquired from the navigation system 12 to the exterior information acquired from the roadside optical beacon communicator 100 in accordance with the time when the navigation system 12 acquires the interior information, the interior information is added to the exterior information in accordance with the reliability of the interior information, and it becomes possible to perform the vehicle drive support through the more efficient use of the information from outside of the subject vehicle.

Particularly, it is considered that the interior information acquired by the navigation system 12 has a lower reliability as the acquiring time becomes earlier, and thus the interior information that is added to the exterior information acquired from the roadside optical beacon communicator 100 becomes smaller. In this embodiment, since the information integration unit 23 lessens the interior information that is added to the exterior information acquired from the roadside optical beacon communicator 100 as the time when the navigation system 11 acquires the interior information becomes earlier, the vehicle drive support means lessens the interior information that is added to the exterior information acquired from the roadside optical beacon communicator 100 as the reliability of the interior information acquired by the navigation system 12 becomes lower, and thus it becomes possible to perform the vehicle drive support through the more efficient use of the information from outside of the subject vehicle.

Hereinafter, a second embodiment of the invention will be described. In the vehicle drive support device 10a according to the first embodiment, the interior information that is added to the exterior information acquired from the optical beacon communicator 11 is changed in accordance with the reliability of the interior information acquired by the navigation system 12. However, in this embodiment, whether to acquire the exterior information from the optical beacon communicator 11 is determined or the exterior information to be acquired is changed in accordance with the freshness of the interior information acquired by the navigation system 12 and the priority of the corresponding vehicle drive support of the vehicle drive support system that performs the vehicle drive support using the interior information.

Figure 4:
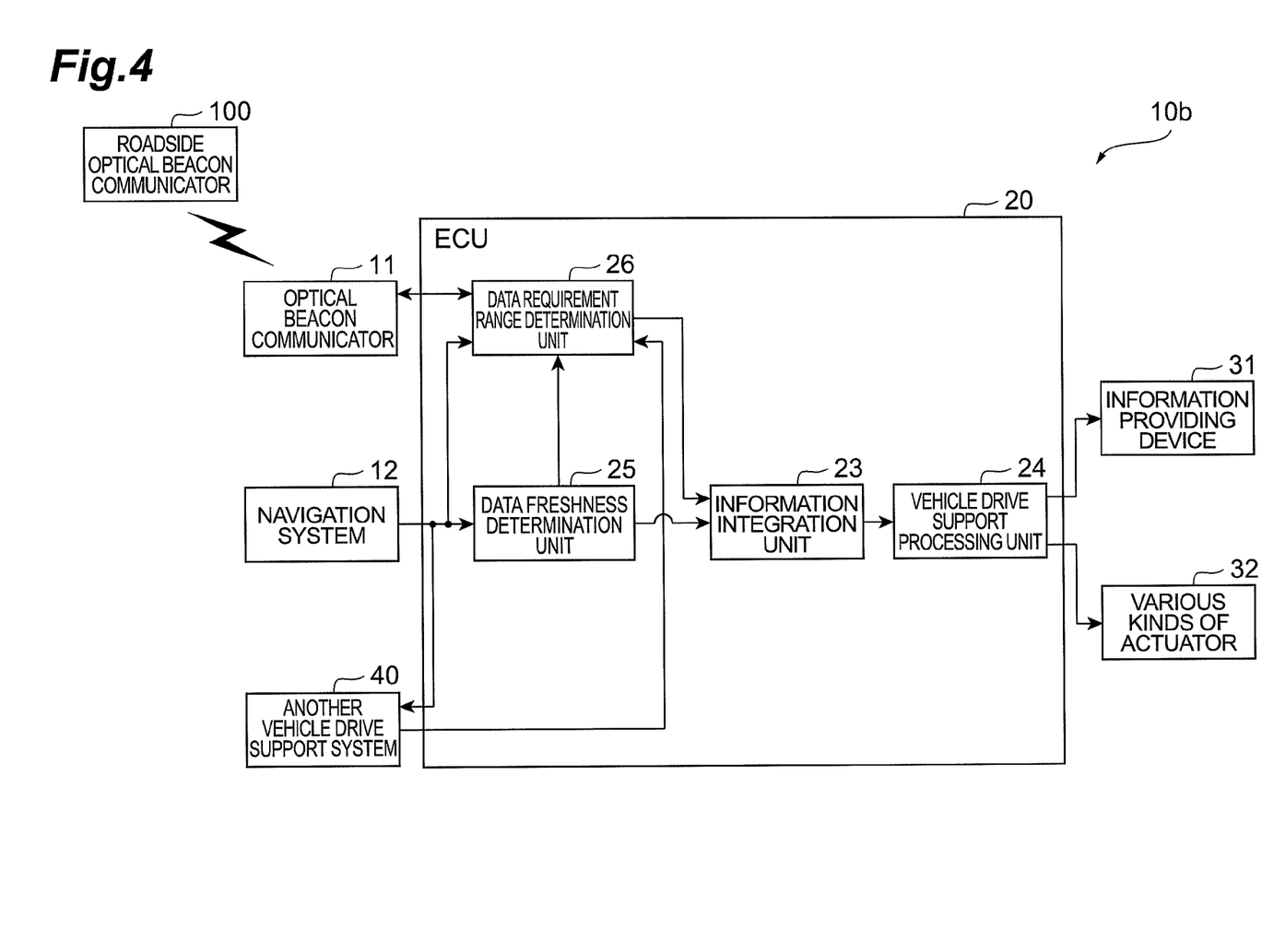
FIG. 4 is a block diagram illustrating the configuration of a vehicle drive support device according to a second embodiment of the invention.

As illustrated in FIG. 4, a vehicle drive support device 10b according to this embodiment includes another vehicle drive support system 40 connected to an ECU 20 to perform the vehicle drive support of the subject vehicle using interior information of the navigation system 12, such as a PCS (pre-Crash Safety) system, an LKA (Lane-Keeping Assist) system, and the like, in addition to the configuration elements connected to the ECU 20 according to the first embodiment of the invention. The ECU 20 has a data freshness determination unit 25 and a data requirement range determination unit 26 instead of the comparison unit 21 and the reliability determination unit 22 according to the first embodiment of the invention.

The data freshness determination unit 25 is to determine the freshness of the corresponding information in accordance with the time when the navigation system 12 acquires the information on roads. The date requirement range determination unit 26 is to determine the data range for requiring the reception from the roadside optical beacon communicator 100 in accordance with the freshness of the information of the navigation system 12 that is determined by the data freshness determination unit 25 and the priority of vehicle drive support that is performed by the other vehicle drive support system 40 using the interior information from the navigation system 12 or the like.

Hereinafter, the operation of the vehicle drive support device 10b according to this embodiment will be described. The roadside optical beacon communicator 100 transmits road linear information (a distance to a certain point, existence/nonexistence of a branch, and a branch angle) and restriction information (restriction speed or once stop) in addition to the information on the signal device. However, if the subject vehicle has correct information sufficiently, such information is unnecessary. Accordingly, in this embodiment, such an unnecessary data reception is omitted to seek the cancellation of delay for processing the data. Also, if the time when the data is transmitted from the roadside optical beacon communicator 100 to the respective vehicles is shortened, the transmission to the following vehicle can be performed after the data is updated. Accordingly, in this embodiment, by omitting the process of receiving unnecessary data, the increase of vehicles that can enjoy the services using the information from the roadside optical beacon communicator 100 is realized.

Figure 5:
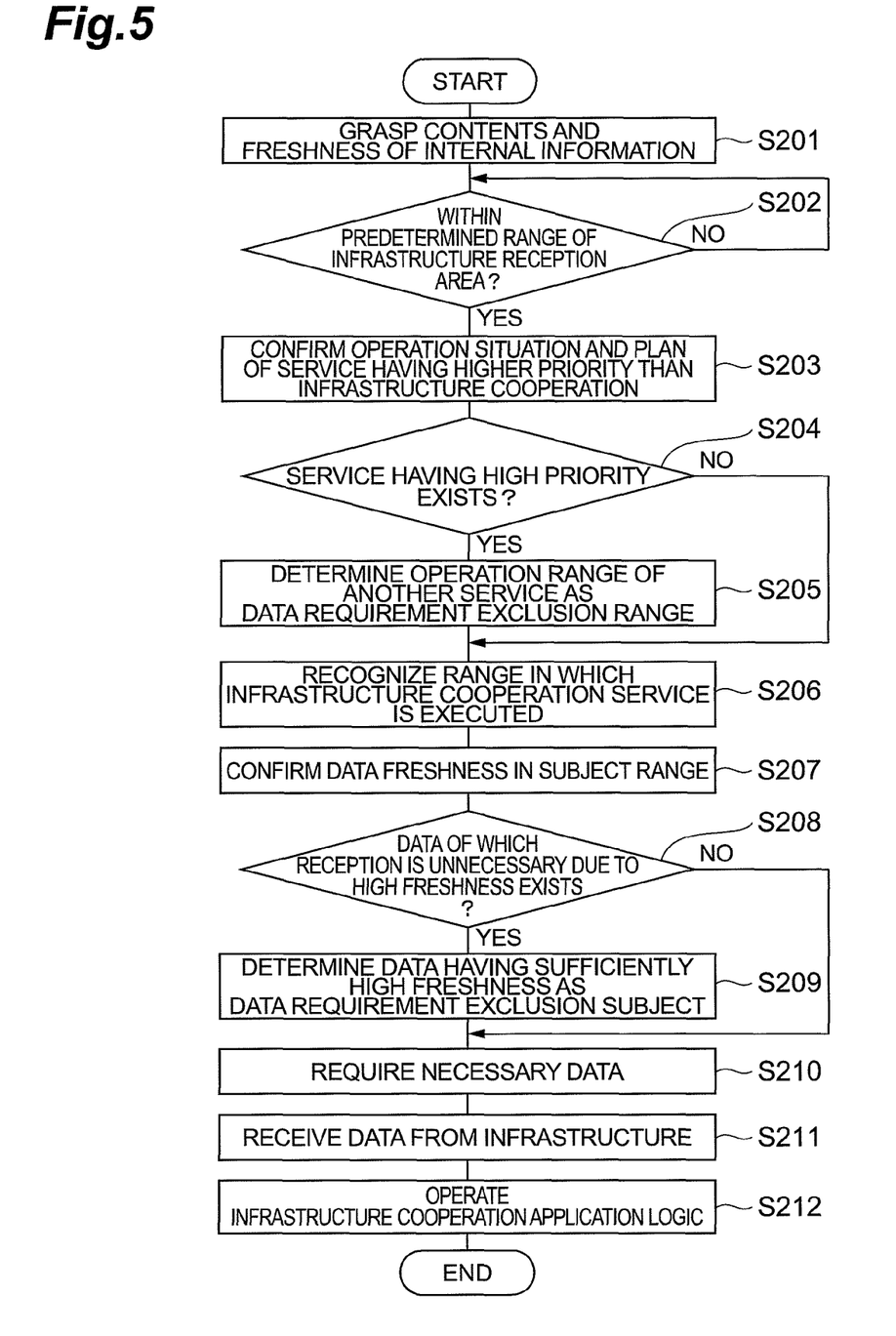
FIG. 5 is a flowchart illustrating the operation of a vehicle drive support device according to a second embodiment of the invention.

As illustrated in FIG. 5, the date freshness determination unit 25 determines the freshness of the data acquired by the navigation system 12 (S201). Since the recent navigation system 12 performs difference update for updating only new portions in the data as needed, it is necessary to grasp the freshness (updating date) of the data that the navigation system 12 actually has. Here, in the vehicle information of the navigation system 12, it is possible to change the required freshness that is the reference for determining the freshness of the contents of each data, such as it is determined that the road linear information is fresh if the updating date is within three months, while the restriction information is fresh if the updating date is within one month.

If the subject vehicle is located within a predetermined range of a reception area of roadside infrastructure such as the roadside optical beacon communicator 100 or the like (S202), the data requirement range determination unit 26 confirms from another vehicle drive system 40 the operation situation and the operation plan of the vehicle drive support system having a higher priority than that of the infrastructure cooperation vehicle drive support that is performed through simultaneous processing of the exterior information from the optical beacon communicator 11 and the interior information of the navigation system 12 (S203).

It is considered that the vehicle drive support system having a high priority prefers the system at the immediate front crossing point in the priorities of, for example, the signal oversight prevention function and once stop oversight function. In the case where the once stop oversight prevention function is performed or is to be performed with respect to the immediate front once stop crossing point of the signal device, the signal oversight prevention function is not performed in the section, and thus it is not necessary to acquire the road linear information in the section from the optical beacon communicator 11. Also, even in the case where the other vehicle drive support system 40 operates a system that requires emergency such as a PCS system or the like, the road linear information is unnecessary, and thus it is not necessary to acquire the road linear information in the section from the optical beacon communicator 11.

In the case of a vehicle drive support system having a high priority as described above (S204), the data requirement range determination unit 26 determines the operation range of the other vehicle drive support system 40 as the data requirement exclusion range in which the data from the roadside optical beacon communicator 100 is not required (S205).

At this time, if there is a possibility that the infrastructure cooperation vehicle drive support using the information from the roadside optical beacon communicator 100 is operated in the case where another function is intentionally in an off state even in the range where the corresponding function is originally preferred, it is necessary to acquire information from the roadside optical beacon communicator 100. In this case, a method of recognizing the range where the infrastructure cooperation vehicle drive support is operated may be a method of recognizing only the range during an initial transmission/reception, a method of studying the range at the time point where the information was received from the roadside optical beacon communicator 100 in the past, and the like.

The data requirement range determination unit 26 recognizes the range where the respective infrastructure cooperation vehicle drive support services are executed (S206). In the case of executing plural services based on the information from the roadside optical beacon communicator 100, for example, it is considered to perform the acquisition of the information as needed as follows.

Figure 6:
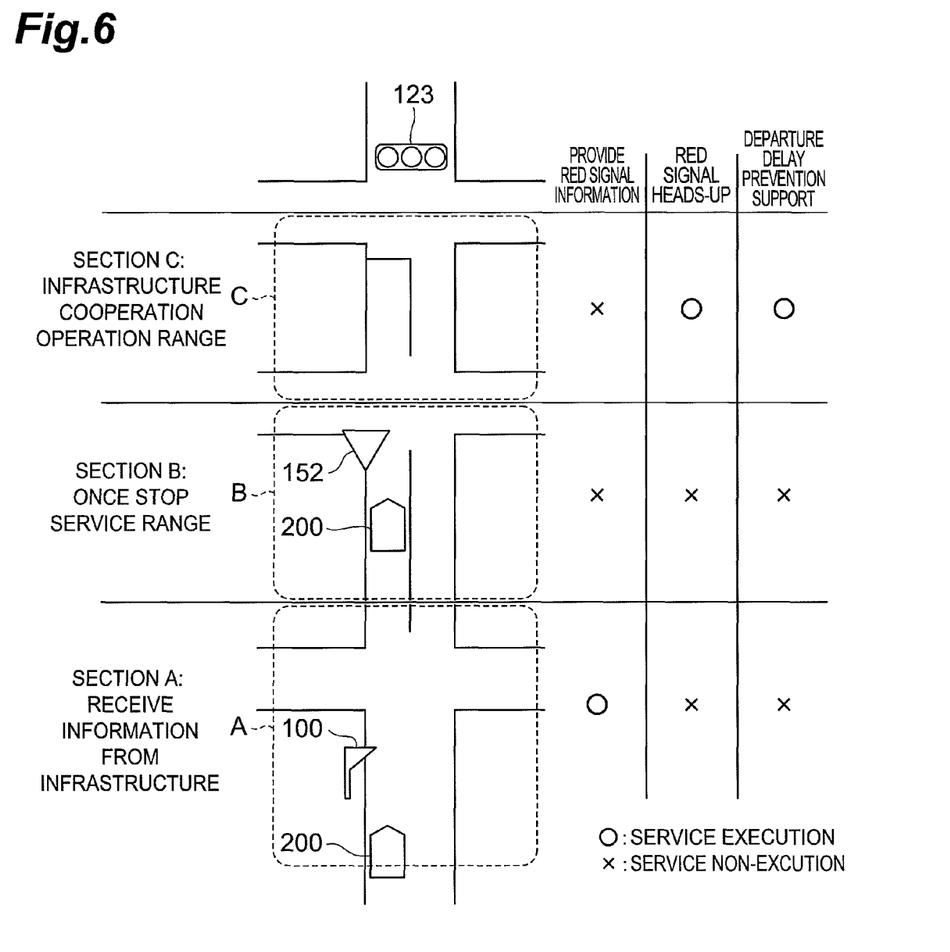
FIG. 6 is a view illustrating services provided by the vehicle drive support device for respective periods.

As illustrated in FIG. 6, in the case where a red signal information providing service is performed, it is necessary for the subject vehicle 200 to acquire the light color of the signal that is currently displayed on the signal device 123 from the roadside optical beacon communicator 100 in the section A. The red signal information providing service is performed only in the section A, but is not performed in sections B and C.

In the case where the red signal heads-up service is performed, the subject vehicle 200 is required to acquire a signal cycle of the signal device 123 from the roadside optical beacon communicator 100 in the section A and the road linear information of the sections A and C from the roadside optical beacon communicator 100 in the sections A and C. The red signal heads-up performing service is performed only in the section C, but is not performed in the sections A and B.

In the case where a blue signal departure delay prevention support service is performed, the subject vehicle 200 is required to acquire the signal cycle of the signal device 123 from the roadside optical beacon communicator 100 in the section A. The departure delay prevention support service is performed only in the region C, but is not performed in the sections A and B.

Figure 7:
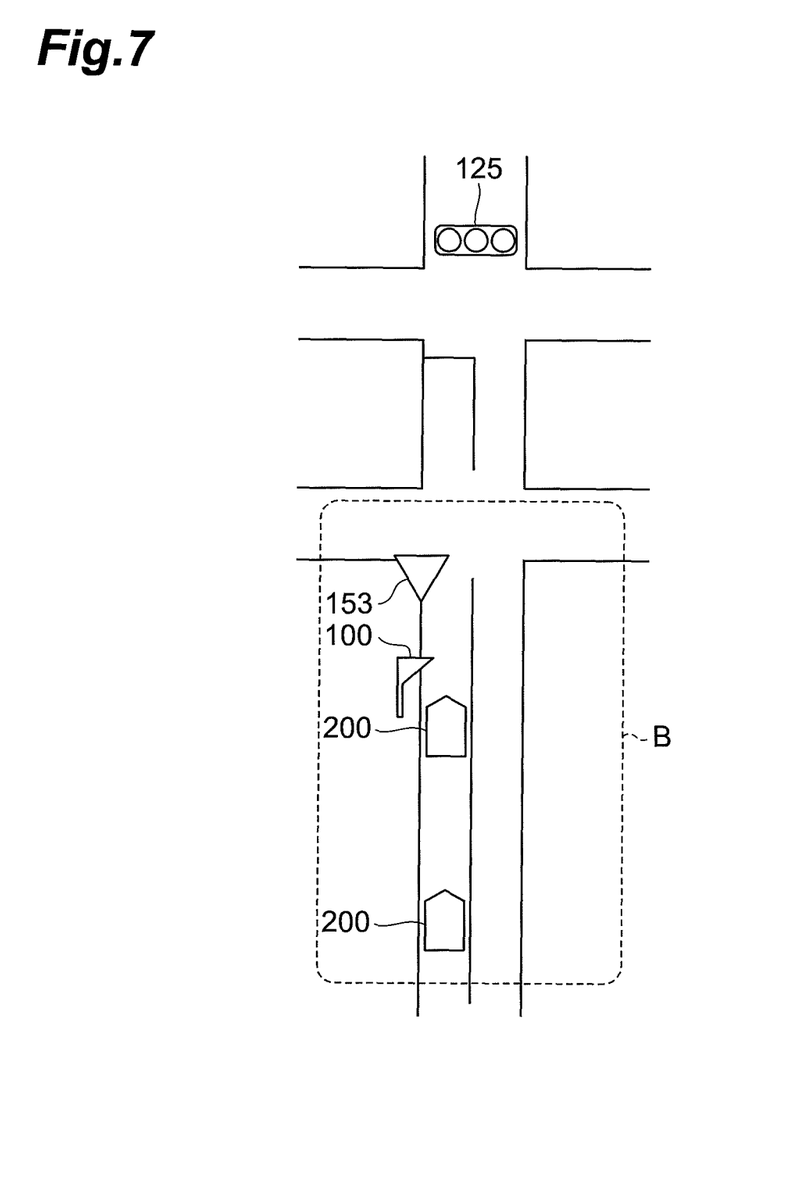
FIG. 7 is a plan view illustrating an example of data that is transmitted by a roadside optical beacon communicator corresponding to services provided by the vehicle drive support device.
Figure 8:
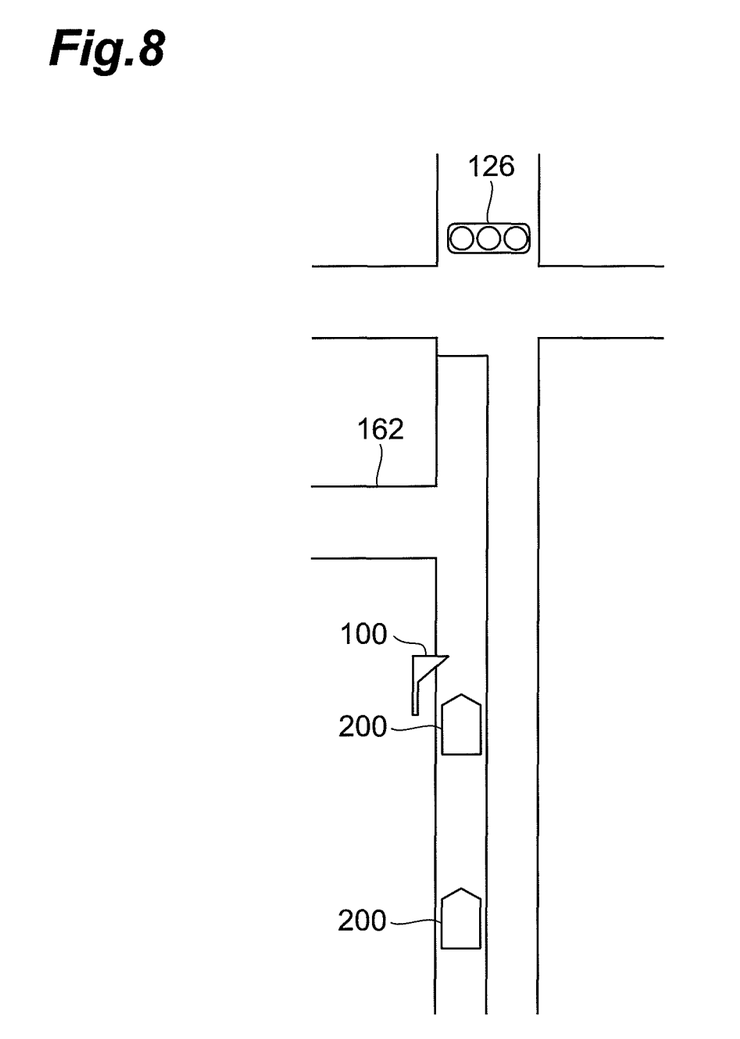
FIG. 8 is a plan view illustrating an example of data that is transmitted by a roadside communicator corresponding to data freshness.

As described above, even in the case where either of the services is performed, the information required to be received from the roadside optical beacon communicator 100 only includes a signal cycle of the signal device 123 in the section A and road linear information of the sections A and C in the sections A and C. Accordingly, as illustrated in FIG. 6 or 7, in the section B where the once stop service is performed, since the stop line positions 152 and 153 are obtained by the information of the navigation system 12, it is not required to receive the information from the roadside optical beacon communicator 100.

At this time, in a device which does not require to receive the information from the roadside optical beacon communicator 100 in the case where the infrastructure cooperation vehicle drive support service as described above is not operated, for example, even if the infrastructure cooperation vehicle drive support service is not operated in an overspeed condition, there is a possibility that the deceleration is made after passing through the roadside optical beacon communicator 100, and thus it may be necessary to receive the information from the roadside optical beacon communicator 100. However, even in this case, for example, the information from the roadside beacon communicator 100 may be unnecessary in a range where a complete deceleration is not performed in consideration of the vehicle performance such as requirement of the traveling distance Ym in order to reduce the speed by Xkm/h, and the like.

Also, if the inoperative condition of another service includes an inoperative condition of the infrastructure cooperation vehicle drive support service in adjustment with another service having a high priority, the information from the roadside optical beacon communicator 100 becomes unnecessary in the range at any rate. For example, the once stop service by the information of the navigation system 12 does not operate at a vehicle speed that is equal to or higher than 70 km/h. However, if the current vehicle speed is 80 km/h in the case where the infrastructure cooperation signal oversight prevention service does not operate even at a vehicle speed of 60 km/h, neither of the services is performed, and thus the information from the roadside optical beacon communicator 100 is unnecessary in the once stop service period.

Referring again to FIG. 5, the data freshness determination unit 25 confirms the freshness of the interior information of the navigation system 12 in the range where the infrastructure cooperation service is performed (S207). The data requirement range determination unit 26 determines whether there is the information that is unnecessary to receive from the roadside optical beacon communicator 100 since the freshness of the interior information of the navigation system 12 is high (S208).

The data requirement range determination unit 26 considers the information in the range that overlaps the interior information of the navigation system 12, which is determined to have the freshness by the data freshness determination unit 25 (S208) as the information of which the reception from the roadside optical beacon communicator 100 is unnecessary, and determines the information as the date requirement exclusion subject (S209). The data requirement range determination unit 26 requires necessary data from the roadside optical beacon communicator 100 through the optical beacon communicator 11 (S210). The optical beacon communicator 11 receives necessary data from the roadside optical beacon communicator 100 (S211).

In the case of receiving data from the roadside optical beacon communicator 100, the subject vehicle 200 transmits an inherent ID for each vehicle, and at this time, it can receive only necessary data through requiring of the data that matches the information of the vehicle side. Also, in this embodiment, the method of transmitting only necessary information from the roadside optical beacon communicator 100 is exemplified. However, it is also possible to adopt a method of receiving all information transmitted form the roadside optical beacon communicator 100 through the optical beacon communicator 11 and deleting unnecessary information before decoding the information on the vehicle side.

The information integration unit 23 adds the exterior information acquired from the roadside optical beacon communicator 100 to the interior information acquired from the navigation system 12, and the vehicle drive support processing unit 24 calculates the logic for executing the infrastructure cooperation application such as the signal oversight prevention function or the like, and performs the vehicle drive support through the information providing device 31 or the various kinds of actuators 32 (S212).

It is considered that the interior information of the navigation system 12 has a different reliability caused by the acquiring time. In this embodiment, since the data requirement range determination unit 26 determines whether to acquire the exterior information from the roadside optical beacon communicator 100 or changes the exterior information to be acquired in accordance with the time when the navigation system 12 acquires the interior information, the optical beacon communicator 11 determines whether to acquire the exterior information or changes the exterior information to be acquired in accordance with the reliability of the interior information, thus it becomes possible to perform the vehicle drive support through the more efficient use of the information from outside of the subject vehicle.

In particular, it is considered that the interior information by the navigation system 12 has a higher reliability as the acquiring time is recent, and thus a lot of exterior information is unnecessary. In this embodiment, since the data requirement range determination unit 26 lessens the exterior information that is acquired from the roadside optical beacon communicator 100 as the time when the navigation system 12 acquires the interior information is recent, the optical beacon communicator 11 lessens the exterior information to be acquired as the interior information is recent and the reliability becomes higher, and thus it becomes possible to perform the vehicle drive support through the more efficient use of the information from outside of the subject vehicle.

Also, it is considered that the exterior information that is acquired from the roadside optical beacon communicator 100 as needed may differ depending on which vehicle drive support is to be performed using the interior information by the navigation system 12 inside the subject vehicle. In this embodiment, since the data requirement range determination unit 26 changes the exterior information that is acquired from the roadside optical beacon communicator 100 in accordance with the contents of the vehicle drive support of the subject vehicle that the other vehicle drive support system 40 or the like performs using the interior information of the navigation system 12, the data requirement range determination unit 26 changes the exterior information that is acquired from the data requirement range determination unit 26 depending on which vehicle driver support is to be performed using the interior information inside the subject vehicle, and thus it becomes possible to perform the vehicle drive support through the more efficient use of the information from outside of the subject vehicle.

In particular, it is considered that if the priority of the contents of the vehicle drive support of the subject vehicle, which the other vehicle drive support system 40 or the like performs using the interior information of the navigation system 12, becomes higher, the priority of the vehicle drive support using the exterior information from the roadside optical beacon communicator 100 becomes lower, and the necessity of the exterior information from the roadside optical beacon communicator 100 becomes lower. In this embodiment, the data requirement range determination unit 26 lessens the exterior information to be acquired as the priority of the contents of the vehicle drive support of the subject vehicle, which the other vehicle drive support system 40 or the like performs using the interior information of the navigation system 12, becomes higher, and if the necessity of the exterior information is low, the data requirement range determination unit 26 lessens the exterior information to be acquired, and thus it becomes possible to perform the vehicle drive support through the more efficient use of the information from outside of the subject vehicle.

Although embodiments of the present invention have been described, the present invention is not limited to the above-described embodiments, and diverse modifications thereof are possible.

Industrial Applicability

According to the present invention, it is possible to perform vehicle drive support through the more efficient use of the information from outside of the subject vehicle.

The invention claimed is:

1. A vehicle drive support device comprising:
exterior information acquisition means capable of acquiring exterior information on roads from an external information source outside a subject vehicle;
interior information acquisition means capable of acquiring interior information on roads from an interior information source inside the subject vehicle; and
vehicle drive support means for performing vehicle drive support of the subject vehicle using the exterior information acquired by the exterior information acquisition means,
wherein the vehicle drive support means changes use aspects of the exterior information for the vehicle drive support in accordance with the interior information acquired by the interior information acquisition means, and
the exterior information acquisition means changes the exterior information to be acquired in accordance with a time when the interior information acquisition means acquires the interior information.

2. A vehicle drive support device comprising:
exterior information acquisition means capable of acquiring exterior information on roads from an external information source outside a subject vehicle;
interior information acquisition means capable of acquiring interior information on roads from an interior information source inside the subject vehicle; and
vehicle drive support means for performing vehicle drive support of the subject vehicle using the exterior information acquired by the exterior information acquisition means,
wherein the vehicle drive support means changes use aspects of the exterior information for the vehicle drive support in accordance with the interior information acquired by the interior information acquisition means,
the vehicle drive support means performs the vehicle drive support of the subject vehicle using the interior information acquired by the interior information acquisition means, and
the exterior information acquisition means changes the exterior information to be acquired in accordance with the contents of the vehicle drive support of the subject vehicle that the vehicle drive support means performs using the interior information.

3. A vehicle drive support device comprising:
exterior information acquisition means capable of acquiring exterior information on roads from an external information source outside a subject vehicle;
interior information acquisition means capable of acquiring interior information on roads from an interior information source inside the subject vehicle; and
vehicle drive support means for performing vehicle drive support of the subject vehicle using the exterior information acquired by the exterior information acquisition means,
wherein the vehicle drive support means changes use aspects of the exterior information for the vehicle drive support in accordance with the interior information acquired by the interior information acquisition means, and
the vehicle drive support means performs the vehicle drive support of the subject vehicle by adding the interior information to the exterior information in accordance with time when the interior information acquisition means acquires the interior information.

4. A vehicle drive support device comprising:

exterior information acquisition means capable of acquiring exterior information on roads from an external information source outside a subject vehicle;

interior information acquisition means capable of acquiring interior information on roads from an interior information source inside the subject vehicle; and vehicle drive support means for performing vehicle drive support of the subject vehicle using at least one of the exterior information acquired by the exterior information acquisition means and the interior information acquired by the interior information acquisition means, wherein the exterior information acquisition means determines whether to acquire the exterior information or changes the exterior information to be acquired in accordance with a time when the interior information acquisition means acquires the interior information.

5. A vehicle drive support device comprising:

exterior information acquisition means capable of acquiring exterior information on roads from an external information source outside a subject vehicle;

interior information acquisition means capable of acquiring interior information on roads from an interior information source inside the subject vehicle; and vehicle drive support means for performing vehicle drive support of the subject vehicle using at least one of the exterior information acquired by the exterior information acquisition means and the interior information acquired by the interior information acquisition means, wherein the exterior information acquisition means changes the exterior information to be acquired in accordance with the contents of the vehicle drive support of the subject vehicle that the vehicle drive support means performs using the interior information.

6. The vehicle drive support device according to claim 1, wherein the exterior information acquisition means lessens the exterior information to be acquired as the time when the interior information acquisition means acquires the interior information becomes more recent.

7. The vehicle drive support device according to claim 4, wherein the exterior information acquisition means lessens the exterior information to be acquired as the time when the interior information acquisition means acquires the interior information becomes more recent.

8. The vehicle drive support device according to claim 2, wherein the exterior information acquisition means lessens the exterior information to be acquired as a priority of the contents of the vehicle drive support of the subject vehicle, which the vehicle drive support means performs using the interior information, becomes higher.

9. The vehicle drive support device according to claim 5, wherein the exterior information acquisition means lessens the exterior information to be acquired as a priority of the contents of the vehicle drive support of the subject vehicle, which the vehicle drive support means performs using the interior information, becomes higher.

10. The vehicle drive support device according to claim 3, wherein the vehicle drive support means performs the vehicle drive support of the subject vehicle by lessening the interior information that is added to the exterior information as the time when the interior information acquisition means acquires the interior information becomes earlier.

* * * * *